United States Patent
Mann et al.

(10) Patent No.: US 9,423,858 B2
(45) Date of Patent: Aug. 23, 2016

(54) SHARING POWER BETWEEN DOMAINS IN A PROCESSOR PACKAGE USING ENCODED POWER CONSUMPTION INFORMATION FROM A SECOND DOMAIN TO CALCULATE AN AVAILABLE POWER BUDGET FOR A FIRST DOMAIN

(71) Applicant: Intel Corporation, Santa Clara, CA (US)

(72) Inventors: Xiuting C. Mann, Portland, OR (US); Avinash Ananthakrishnan, Hillsboro, OR (US); Michael N. Derr, El Dorado Hills, CA (US); Craig Forbell, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 690 days.

(21) Appl. No.: 13/628,172

(22) Filed: Sep. 27, 2012

(65) Prior Publication Data

US 2014/0089688 A1    Mar. 27, 2014

(51) Int. Cl.
G06F 1/00   (2006.01)
G06F 1/32   (2006.01)
G06F 1/20   (2006.01)

(52) U.S. Cl.
CPC .............. *G06F 1/324* (2013.01); *G06F 1/3206* (2013.01); *G06F 1/206* (2013.01); *Y02B 60/1217* (2013.01); *Y02B 60/1275* (2013.01)

(58) Field of Classification Search
CPC ........................................................ G06F 1/26
USPC ......................................................... 713/300
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |

(Continued)

FOREIGN PATENT DOCUMENTS

EP    1 282 030 A1    5/2003

OTHER PUBLICATIONS

U.S. Appl. No. 13/600,666, filed Aug. 31, 2012, entitled "Performing Cross-Domain Thermal Control in a Processor," by Xiuting C. Man et al.

(Continued)

*Primary Examiner* — Robert Cassity
(74) *Attorney, Agent, or Firm* — Trop, Pruner & Hu, P.C.

(57) ABSTRACT

In an embodiment, the present invention includes a processor having a first domain with at least one core to execute instructions, a second domain coupled to the first domain and having at least one non-core circuit, and a power control unit (PCU) coupled to the first and second domains. The PCU may include a power sharing logic to receive encoded power consumption information from the second domain and to calculate an available power budget for the first domain based at least in part on the encoded power consumption information. Other embodiments are described and claimed.

12 Claims, 7 Drawing Sheets

(56) References Cited

U.S. PATENT DOCUMENTS

| | | | |
|---|---|---|---|
| 6,996,728 B2 | 2/2006 | Singh | |
| 7,010,708 B2 | 3/2006 | Ma | |
| 7,043,649 B2 | 5/2006 | Terrell | |
| 7,093,147 B2 | 8/2006 | Farkas et al. | |
| 7,111,179 B1 | 9/2006 | Girson et al. | |
| 7,194,643 B2 | 3/2007 | Gonzalez et al. | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,529,956 B2 | 5/2009 | Stufflebeam | |
| 7,539,885 B2 | 5/2009 | Ma | |
| 7,730,340 B2 | 6/2010 | Hu et al. | |
| 7,949,887 B2 | 5/2011 | Gunther et al. | |
| 8,069,358 B2 | 11/2011 | Gunther et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0132238 A1 | 6/2005 | Nanja | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0095796 A1* | 5/2006 | Chotoku et al. | 713/300 |
| 2006/0117202 A1 | 6/2006 | Magklis et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0079294 A1 | 4/2007 | Knight | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0239398 A1 | 10/2007 | Song et al. | |
| 2007/0245163 A1 | 10/2007 | Lu et al. | |
| 2008/0028240 A1 | 1/2008 | Arai et al. | |
| 2008/0040563 A1* | 2/2008 | Brittain et al. | 711/154 |
| 2008/0250260 A1 | 10/2008 | Tomita | |
| 2009/0006871 A1 | 1/2009 | Liu et al. | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2011/0022865 A1* | 1/2011 | Gunther et al. | 713/322 |
| 2011/0154090 A1 | 6/2011 | Dixon et al. | |
| 2011/0258470 A1* | 10/2011 | Ryoo | 713/323 |
| 2012/0054528 A1* | 3/2012 | Bose et al. | 713/340 |
| 2012/0079290 A1 | 3/2012 | Kumar et al. | |
| 2013/0080804 A1 | 3/2013 | Ananthakrishan et al. | |
| 2013/0138977 A1* | 5/2013 | Herman et al. | 713/300 |
| 2013/0173941 A1 | 7/2013 | Ananthakrishnan et al. | |
| 2014/0068293 A1 | 3/2014 | Man et al. | |

OTHER PUBLICATIONS

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel Developer Forum, IDF2010, Opher Kahn, et al., "Intel Next Generation Microarchitecture Codename Sandy Bridge: New Processor Innovations," Sep. 13, 2010, 58 pages.

U.S. Appl. No. 13/340,433, filed Dec. 29, 2011, entitled "Controlling Power Consumption Through Multiple Power Limits Over Multiple Time Intervals," by Efraim Rotem, et al.

* cited by examiner

SHARING POWER BETWEEN DOMAINS IN A PROCESSOR PACKAGE USING ENCODED POWER CONSUMPTION INFORMATION FROM A SECOND DOMAIN TO CALCULATE AN AVAILABLE POWER BUDGET FOR A FIRST DOMAIN

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. For example with smaller form factor systems, there is a push towards integrating several discrete platform components within the same package. As such, components are combined either on the same physical die or within a shared common socket. Power and thermal specifications are typically defined for a socket. On legacy platforms where such components are distinct physical chips on the platform, their power and thermal design points are individually specified. With integration of a package, a common power and thermal specification is shared by multiple die.

Thermal design power (TDP) is one such constraint that is specified for an integrated package. TDP defines the steady state power that the package can consume and still remain within the cooling capacity of the platform. When TDP is specified for the entire package, it leads to the question of how the power envelope is to be shared between different compute entities. Statically assuming worst case power consumption on each sub-component of a package can lead to taking large guard bands. As a result, operation of the compute entities is at a lower than optimal frequency, and thereby leaves power and performance unavailable.

DETAILED DESCRIPTION

Embodiments may be used to control and manage a power budget of a processor such as a multichip processor (MCP) in an optimal manner. More specifically, embodiments may enable this optimal sharing of a power budget between different components using a low overhead mechanism.

Examples described herein are in connection with a multicore processor including multiple processor cores and one or more other processing engines, as well as other circuitry. For example, in a particular embodiment described herein, a processor package can include multiple semiconductor die including a so-called central processing unit (CPU) die and at least one other die which may include memory, controller circuitry, or other logic. In an example embodiment, optimal power sharing can be realized for a MCP having multiple die, including a separate peripheral controller hub (PCH) die and a central processing unit (CPU) die. In one embodiment, multiple independent domains may be present on the CPU die, including a core domain having one or more cores, a graphics domain having one or more graphics engines, and a so-called system agent or uncore domain that includes additional processor circuitry. As used herein the term "domain" is used to mean a collection of hardware and/or logic that operates at the same voltage and frequency point. With reference to a MCP, note that each die may also be considered an independent domain although each such die may itself include multiple domains. Although many implementations described herein are for a MCP in which different domains can be present on different semiconductor die of a single package, a multi-domain processor also can be formed on a single semiconductor die in other implementations.

In a multi-domain processor, the multiple domains collectively share a single power budget. Accordingly, the higher the frequency at which, e.g., the CPU domain is operating, the higher the power consumed by the CPU domain. And in turn, the higher the power consumed by the CPU domain, the less power is left for the PCH domain to consume and vice versa. Embodiments may at run time dynamically re-partition how a package power budget is shared between these domains. For ease of discussion, embodiments described herein are with regard to a multi-domain processor including a CPU domain and a PCH domain that can share a power budget. However understand the scope of the present invention is not limited in this regard and additional domains and sub-domains can be present.

To provide for power sharing of these different components, detection/monitoring may be performed of PCH and CPU power consumption over time. In addition, a software interface may be provided to communicate thresholds, along with a combined hardware and software interface between the CPU and PCH to dynamically communicate power consumed over a given time interval. Based at least in part on this information, a power sharing algorithm may be executed to share power between MCP entities.

To determine power consumption of the various components, one or more power meters can be implemented within the components. Although the scope of the present invention is not limited in this regard, such power meters may include activity trackers that provide information used to track power. For example, activity may be tracked at various micro-architectural points within a component to enable an estimation of the power consumed by each hardware component. In turn, an interface coupled between the PCH and CPU may communicate the power consumed by the PCH over a time interval. In one embodiment, this interface may be a serial interface.

For increasing the resolution of PCH power consumption communication to the CPU, the number of bits transmitted over this interface increases. This results in an increased hardware cost, increased protocol implementation cost and validation complexity and also latency of the link. Embodiments may provide a technique to reduce the number of bits communicated while maintaining or even increasing the resolution.

As mentioned above, a software interface may be used to communicate power thresholds between the CPU and PCH. These power thresholds may be stored in a non-volatile storage of the processor. As an example, such values, which may be obtained during high volume manufacturing (HVM) testing, may be programmed into fuses, persistent registers or other non-volatile storage. In an embodiment such storage may be included in or be associated with a power controller of the CPU such as a power control unit (PCU). These thresholds may correspond to values of power consumption by the PCH at various predetermined levels of activity, namely at various scenarios of execution performed during the HVM testing.

Embodiments may thus control power sharing between multiple entities (in one example between a PCH and CPU) in an MCP package with minimal hardware and software costs. As an example embodiment assume that a PCU implements an algorithm to control power over an averaging time window. In this embodiment a rolling average power limiting (RAPL) algorithm may be used to control the frequency of operation of different compute entities to keep them within a power limit over a time window. In one embodiment, the RAPL algorithm can control the non-PCH components to a new power limit. As the activity in the PCH changes with workload execution, the PCH periodically passes power consumption information via the link between the PCH and the CPU. In this way, the PCU can accurately allocate a power limit for a remainder of the MCP, instead of assuming that the PCH is always at its peak activity level and over-throttling the non-PCH domains. To this end, CPU performance states (P-states) may be throttled to keep the MCP within a power limit averaged over a time window.

For example, according to an operating system (OS)-based mechanism, namely the Advanced Configuration and Platform Interface (ACPI) standard (e.g., Rev. 3.0b, published Oct. 10, 2006), a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. At any of these performance states, and more likely in a P0 or P1 state, a voltage and frequency can be adjusted based on power consumption information received from a PCH.

Figure 1:
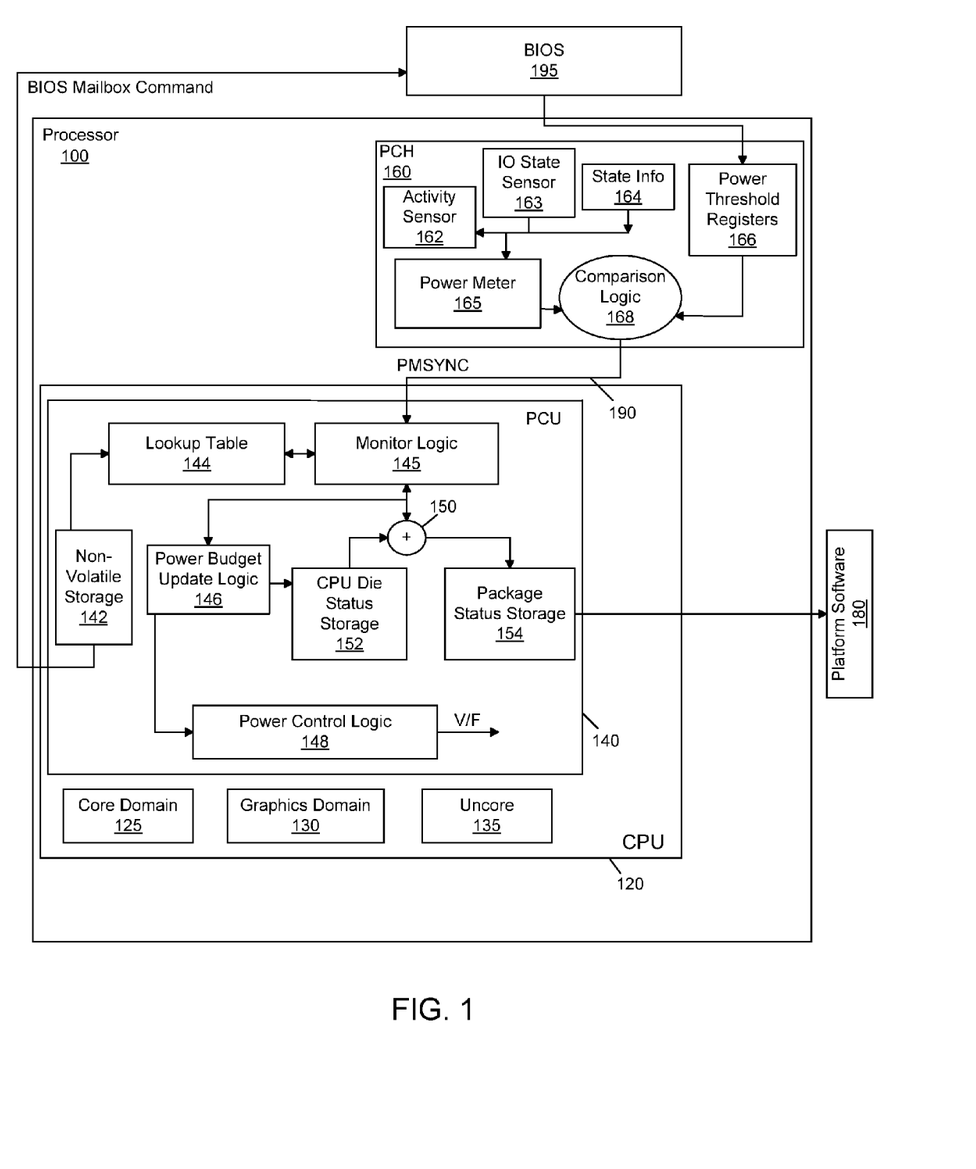
FIG. 1 is a block diagram of a processor in accordance with an embodiment of the present invention.

Referring now to FIG. 1, shown is a block diagram of a processor in accordance with an embodiment of the present invention. In FIG. 1, processor 100 may be a multicore processor that in the embodiment shown is a MCP having a first die 120 and a second die 160. As seen, first die 120 may be a CPU die that includes a plurality of independent domains. As also seen, second die 160 may be a PCH. In general, the PCH may include interface and control circuitry to provide an interface between the processor and a variety of peripheral devices such as input/output (IO) devices, e.g., user input devices (e.g., keyboard, touchpad, mouse or other pointing device, or so forth) and storage devices such as a mass storage, portable or other such storage, among many other peripheral devices.

CPU die 120 may include multiple domains including a core domain 125 which may include one or more processor cores, a graphics domain 130 which may include one or more graphics processing units (GPU) such as one or more graphics cores, and an uncore domain 135 which may include other circuitry of the processor such as cache memories, a memory controller, other fixed function units, logic circuitry and so forth. As further seen, CPU die 120 further includes a power control unit (PCU) 140 which in the embodiment shown may be configured with various circuitry, logic and so forth to perform power management operations for the processor. Note that the view shown in FIG. 1 is at a high level to show the features relevant to power sharing control in accordance with an embodiment of the present invention and is not intended to show the full processor circuitry. In addition, the location of some circuitry is shown logically rather than physically, in that in some embodiments PCU 140 may be physically part of uncore domain 135. Generally the details of PCU 140 shown in FIG. 1 may correspond to a power sharing logic to calculate an available power budget for CPU die 120 and take appropriate action, based on encoded power consumption information received from PCH die 160.

PCU 140 may include a monitor logic 145 to receive power status information (which can be received in an encoded manner) from PCH 160 and based on this information, determine an actual power consumption estimate for the PCU. Note that this received encoded information is not a coding of an actual power consumption value, but instead is a coding of another value that can be used to select this power consumption value from a plurality of power consumption values stored in a storage accessible to the PCU. Responsive to this power level status information received from the PCH, the PCU performs a look up to a table 144 programmed during HVM testing to translate this encoded information into power being consumed by the PCH, e.g., in watts. Monitor logic 145 may provide this power consumption estimate to a power budget update logic 146 that may generate one or more updated power budgets by subtracting the power consumption estimate from configured power budgets for the package such as a first power budget (PL1), namely a thermal limitation, e.g., a TDP budget which may be a steady state power budget limit, and a second power budget (PL2), namely an electrical limitation or maximum power budget corresponding to an instantaneous state budget that cannot be exceeded. In turn, this updated power budget based on the power consumption information received from the PCH may be provided to a power control logic 148. Based on information regarding power consumption in the CPU die itself, in addition to the updated power budget received from power budget update logic 146, power control logic 148 may determine a power consumption level at which the CPU die can operate. Accordingly, power control logic 148 may communicate voltage and frequency information to the other domains of the CPU die to enable their operation at updated performance levels.

As further seen in FIG. 1, an adder 150 also receives the updated PCH power consumption value and combines this value with a CPU die consumption value stored in a CPU status storage 152 to thus obtain a package power consumption value corresponding to the current power consumption of the processor package, to be stored in a package status storage 154. In turn, this information regarding the current actual power consumption value of the processor package can be communicated to external agents such as a platform software 180.

As further seen, PCU 140 may include a non-volatile storage 142 which can be implemented via fuses, non-volatile registers or another non-volatile storage to store the fused PCH power values obtained during HVM testing as described above. When a system including processor 100 is powered on, theses values may be provided to lookup table 144, where each of the values can be stored in a corresponding entry of the lookup table accessed by an index value, e.g., corresponding to identifiers for the registers from which these values were obtained (in an implementation in which non-volatile storage 142 is formed of such registers). Also upon start up of a system, a BIOS 195, via a BIOS mailbox command, these fused PCH power values may also be communicated to PCH 160 and stored into power threshold registers 166.

Still referring to FIG. 1, PCH 160 may include a power meter 165 which may receive various inputs, including information from one or more activity sensors 162, information regarding one or more IO states via an IO state sensor 163 of the PCH, and additional information 164 which in an embodiment may include power conversion factors from activity and/or IO states and configurations. Based on all this information provided to power meter 165, an estimate of the actual power consumption by the PCH may be determined. During normal operation, the PCH executes a periodic loop where it tracks micro-architectural activity at its various interfaces via power meter 165, and uses the information to estimate the power consumed by the PCH or what kind of scenario is currently being run on the PCH. In turn, this estimate may be compared in a comparator 168 to one or more of the fused PCH power values provided via power threshold registers 166. In this way, the closest fused power value to the estimated power consumption value determined by power meter 165 can be determined. In turn, a power consumption message can be sent from the PCH to CPU die 120, and more specifically to PCU 140 via a sideband message link 190, which in an embodiment can be a power management synchronization (PMSYNC) link. In one embodiment, this message may be via an encoded representation of the estimated power consumption, e.g., an index value, such that this information can be communicated with a small number of bits communicated on one or more lanes of the sideband message link.

While shown at this high level in the embodiment of FIG. 1, understand the scope of the present invention is not limited in this regard. For example, while FIG. 1 shows an implementation in which a multicore processor is configured as a MCP including two die, in another embodiment the multicore processor may be a single die processor including both the circuitry present on the CPU die as well as the circuitry present on the PCH die. In addition, it is to be understood that additional circuitry may be present. Or in other embodiments, a different type of non-CPU circuitry may be present in a multicore processor. For example, in another embodiment instead of a PCH die, an integrated memory die or another type of die may be provided within a multicore processor.

Figure 2:
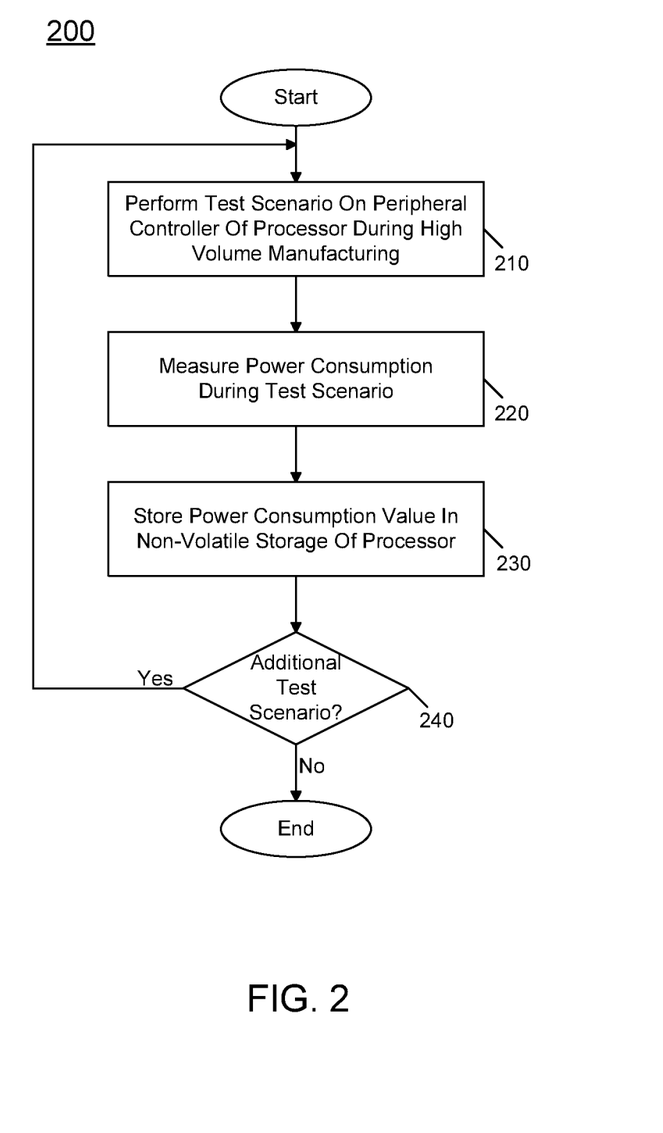
FIG. 2 is a flow diagram of a method for characterizing power consumption of a semiconductor die in accordance with an embodiment of the present invention.

Referring now to FIG. 2, shown is a flow diagram of a method for characterizing power consumption of a semiconductor die in accordance with an embodiment of the present invention. In the specific embodiment shown in FIG. 2, method 200 may be used during high volume manufacturing testing of a semiconductor die including a peripheral controller. Of course, while described in this specific implementation as being performed during HVM testing of a PCH die, understand the scope of the present invention is not limited in this regard and embodiments may be used in connection with characterization of any type of semiconductor die, both during HVM testing as well as other characterization operations.

As seen in FIG. 2, a test scenario may be performed on the peripheral controller of a processor during high volume manufacturing testing (block 210). Note that this HVM testing may be of a completed processor package including a PCH die and a CPU die. Of course in other embodiments, this characterization or test scenario execution may be performed while the semiconductor die is in another state, e.g., as part of a wafer during wafer test operations, or during other testing phases. Note that the test scenario performed may be execution of a predetermined workload on the PCH, e.g., generally corresponding to a percentage utilization of the PCH.

Next, at block 220, the power consumption during such test scenario may be measured (block 220). In an embodiment, a on-die power meter may be used to perform this testing. The power consumption measured may be stored as a power consumption value in a non-volatile storage of the processor, at block 230. As an example, in one embodiment this non-volatile storage may be a fused memory of the CPU die of the package and may be written by test equipment into a given location of this storage. Next, control passes to diamond 240 to determine whether additional test scenarios are available for testing. If so, control passes back to block 210 above. Otherwise the method may conclude. Thus at the conclusion of the above testing operations, multiple power consumption values of the PCH, each corresponding to a representative workload, may be stored in non-volatile storage of the package. As one example, four different workloads or scenarios may be tested, e.g., corresponding to zero, 25%, 50% and 100% PCH utilization rate workloads.

Figure 3:
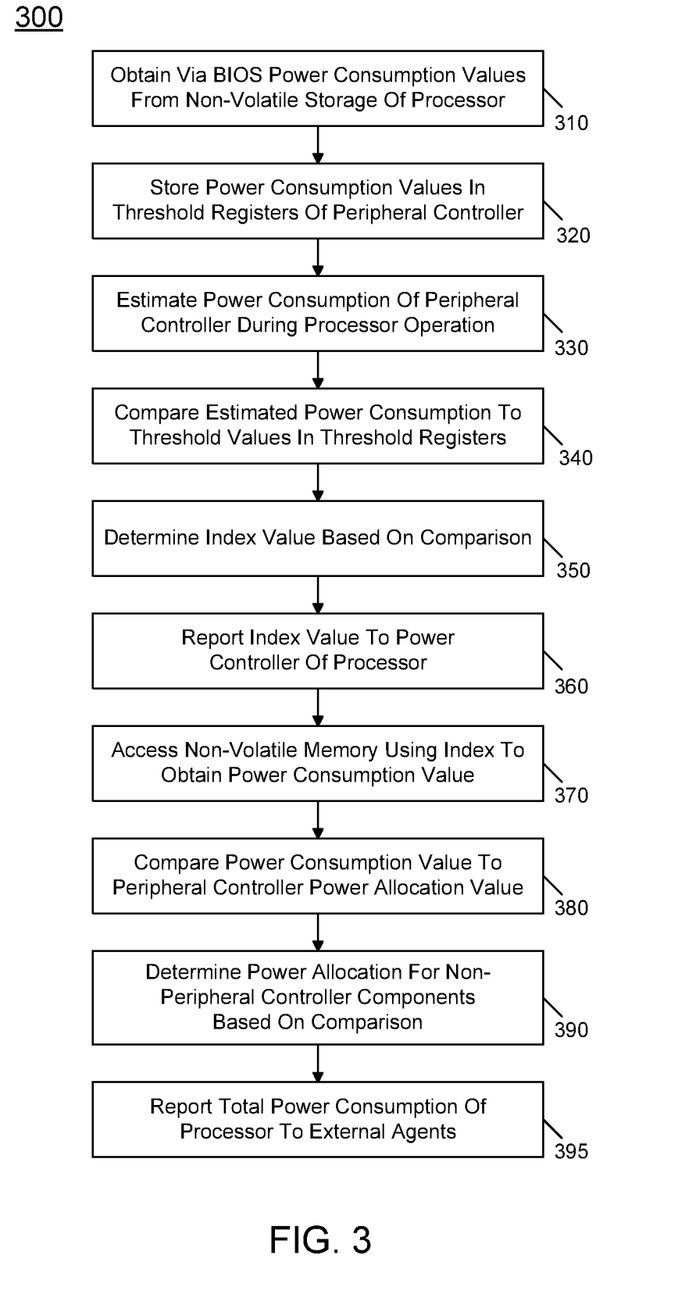
FIG. 3 is a flow diagram of a method for performing power budget sharing between multiple die of a processor package in accordance with an embodiment of the present invention.

Referring now to FIG. 3, shown is a flow diagram of a method for performing power budget sharing between multiple die of a processor package in accordance with an embodiment of the present invention. Method 300, which may be implemented in various logic of a PCU, among other agents, may begin at block 310 by obtaining, via BIOS during system startup, power consumption values from a non-volatile storage of the processor. As discussed above, this non-volatile storage may be fused memory or another non-volatile storage. These power consumption values, namely corresponding to representative power consumption values for predetermined workloads on the PCH, may be stored in threshold registers of the peripheral controller (block 320). As an example, during boot up of a system, BIOS can obtain these values from the non-volatile storage and store them in threshold registers of the peripheral controller. Thus at this point the peripheral controller is configured to perform power estimates during normal operation and communicate encoded information to the CPU die.

As further shown in FIG. 3, during normal operation, power consumption of the peripheral controller may be estimated (block 330). As described above in an embodiment one or more power meters may be present within the peripheral controller itself to enable such estimates. Next, control passes to block 340 where the estimated power consumption may be compared to threshold values in threshold registers. As such, the one of these threshold values closest to the estimated power consumption level can be determined. In an embodiment, the closest threshold value higher than the estimated power of consumption may be the identified threshold value. Next, control passes to block 350 where an index value may be determined based on the comparison. In an embodiment, this index value may correspond to the index of the threshold register that is the closest (on the high side) to the estimated power consumption value.

Still referring to FIG. 3, next at block 360 this index value may be reported to a power controller of the processor, e.g., a PCU. Note that this index value is encoded information regarding the estimated power consumption level of the peripheral controller, and can be communicated using a very limited amount of data, e.g., two bits (in an embodiment where there are four or less scenarios or thresholds stored). Then at block 370 a non-volatile memory can be accessed using this index value to obtain the power consumption value. In another embodiment, instead of accessing a non-volatile memory, e.g., the fuse memory that includes these values, a lookup table that includes the same information may instead be accessed to speed the operation.

Next at block 380, a power controller can compare a peripheral controller power allocation value, which may correspond to a portion of an overall TDP power budget for the PCH, to the power consumption value of the peripheral controller. In this way, when the actual power consumption of the peripheral controller is less than the power allocation value, a greater amount of the total power budget can be allocated to non-PCH components, such as one or more domains of the CPU die. Thus, at block 390 a power allocation for the non-peripheral controller components may be determined based on the above comparison. As such, in instances where the peripheral controller is actually consuming less power than its power allocation value (which may correspond to a maximum allowed power budget for the PCH), greater power budget for the CPU die is thus available. Based on this information, the PCU of the processor can enable one or more cores and other components of the CPU die (such as of a graphics domain) to potentially operate at greater power consumption levels, such as by way of increased frequency and/or voltage operation.

Still referring to FIG. 3, in addition to determining the power allocation and controlling various components of the processor accordingly, the total power consumption of the processor, which corresponds to a sum of the power consumption value obtained from the peripheral controller and a power consumption value of the CPU die, e.g., as determined by one or more power meters of the CPU die, may be reported to external agents (block 395). For example, such information may be reported to platform software such as an OS for use by OS power management code and/or to BIOS for use in various BIOS routines. In addition, this information may be provided to an embedded controller that in turn may take various actions such as controlling a fan speed based on the total power consumption of the processor. Although shown at this high level in the embodiment of FIG. 3, understand the scope of the present invention is not limited in this regard.

As described above, during HVM testing of a MCP including a PCH, multiple workloads may be executed on the PCH, where each workload corresponds to a scenario. During such execution, power consumption of the PCU is measured, and a value of the power consumption may be programmed into non-volatile storage space such as of the PCU, as described above. Referring now to Table 1, shown are example tables to store power consumption values for scenarios executed on two different PCHs.

TABLE 1

| Power Scenario | PCH #1 | PCH #2 |
| --- | --- | --- |
| Scenario1 (Idle) | 50 milliwatts (mW) | 60 mW |
| Scenario2 (25% active) | 1 W | 800 mW |
| Scenario3 (50% active) | 1.5 W | 1.2 W |
| Scenario4 (100% active) | 2 W | 1.8 W |
| ... | | |

As seen in Table 1 due to differences in manufacturing, it is possible for different PCH devices to be at different power consumption levels for execution of the same workload.

Thus based on information obtained during HVM testing and an interface communication of limited complexity to report power consumed by a different die in an MCP, a power controller may optimally share common power budget in an MCP with minimal guardbands.

Assume two MCPs that consume power at different workloads scenarios according to Table 1 above. To be able to distinguish idle power levels between PCH #1 and PCH #2, the granularity at which PCH may report its power may be in increments of 10 milliwatts (mW). Assume the peak power consumed by PCH#1 is 2 W, this means the total number of bits for the PCH to report raw power consumed to the CPU is $\log_2(2\,W/10\,mw)=8$ bits. If during HVM testing, PCH #1 and PCH #2 were tested for power consumed while executing the 4 scenarios described above and these power limits programmed into the respective MCPs, the PCH could report to the CPU at which of these four scenarios or power levels is the PCH running. And thus to enable the reduced communications described herein, this information can be communicated in $\log_2$(number of scenarios) number of bits, or 2 bits here, thus enabling a reduced communication overhead.

In an embodiment, this table may be indexed by a binary encoding. That is, if there are 4 scenarios that are tested, each scenario may be stored in an entry having a corresponding 2-bit index. Note that the number of scenarios may be selected as a tradeoff between the time taken during HVM to characterize the power consumed by each of the workload corresponding to a scenario to the desired granularity of power levels.

Figure 4:
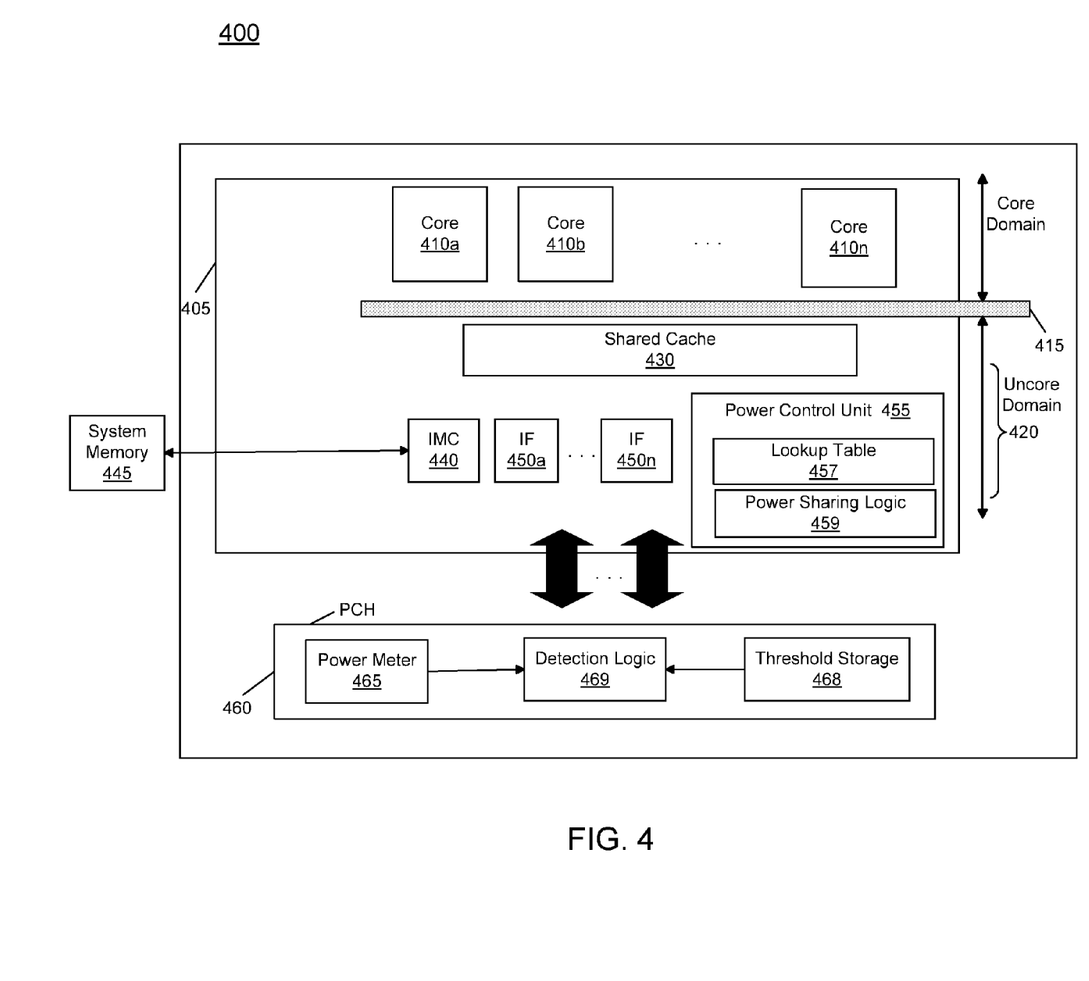
FIG. 4 is a block diagram of a processor in accordance with an embodiment of the present invention.

Referring now to FIG. 4, shown is a block diagram of a processor in accordance with an embodiment of the present invention. As shown in FIG. 4, processor 400 may be a multicore processor including first die 405 having a plurality of cores $410_a$-$410_n$ of a core domain. In one embodiment, each such core may be of an independent power domain and can be configured to operate at an independent voltage and/or frequency, and to enter a turbo frequency mode when available headroom exists. The various cores may be coupled via an interconnect 415 to a system agent or uncore domain 420 that includes various components. As seen, the uncore domain 420 may include a shared cache 430 which may be a last level cache. In addition, the uncore may include an integrated memory controller 440, various interfaces 450 and a power control unit 455.

As further shown in FIG. 4, a PCH die 460 may also be present within processor 400. In the high level view shown in FIG. 4, this die may include a power meter 465 and a threshold storage 468 which can be populated, e.g., by BIOS during initialization to thus load a set of scenario power consumption values into this threshold storage. Then during normal operation, a detection logic 469 may, upon receipt of a power consumption estimate from power meter 465, determine a correlating power consumption value and communicate an encoded representation of this value to first die 405, and more particularly to power control unit 455. Not shown for ease of illustration in FIG. 4 is a graphics domain that can include one or more graphics engines and which may be configured on first die 405.

In various embodiments, power control unit 455 may include a power sharing logic 459, which may be a logic to dynamically share an available power budget between the CPU domain and the PCH domain, and thus to control a CPU domain frequency based on power consumption not only of the domain itself, but also other domains of the processor. In the embodiment of FIG. 4, logic 459 can receive information as to power consumption values in a given non-CPU domain, and determine a power budget and thereafter perform frequency control on another domain, e.g., a CPU domain, in accordance with an embodiment of the present invention. As further seen in FIG. 4 to provide for storage of different power consumption values for use in power sharing operations, a lookup table 457 may further be present within PCU 455 to store such values. Although shown at this location in the embodiment of FIG. 4, understand that the scope of the present invention is not limited in this regard and the storage of this information can be in other locations.

With further reference to FIG. 4, processor 400 may communicate with a system memory 445, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
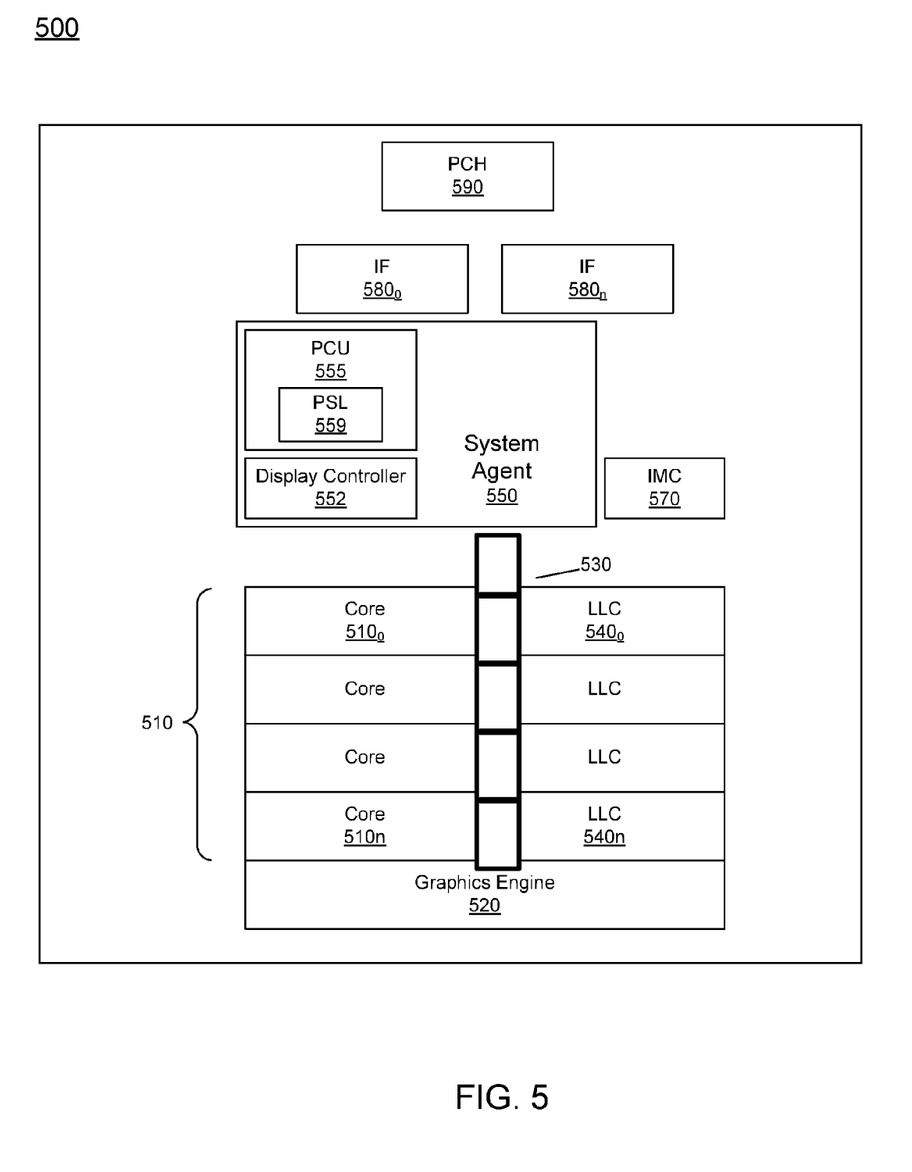
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores $510_0$-$510_n$, a graphics domain 520 can include one or more graphics engines, and a system agent domain 550 may further be present. In various embodiments, system agent domain 550 may execute at a fixed frequency and may remain powered on at all times to handle power control events and power management and each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 550 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 5, system agent domain 550 may include display controller 552 which may provide control of and an interface to an associated display. As further seen, system agent domain 550 may include a power control unit 555 which can include a power sharing logic 559 in accordance with an embodiment of the present invention. In various embodiments, this logic may execute a power sharing algorithm such as shown in FIG. 3 to thus dynamically share an available power budget between CPU and non-CPU domains.

As further seen in FIG. 5, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a PCH 590 may also be present within the processor, and can be implemented on a separate die, in some embodiments. Although shown at this high level in the embodiment of FIG. 5, understand the scope of the present invention is not limited in this regard.

Figure 6:
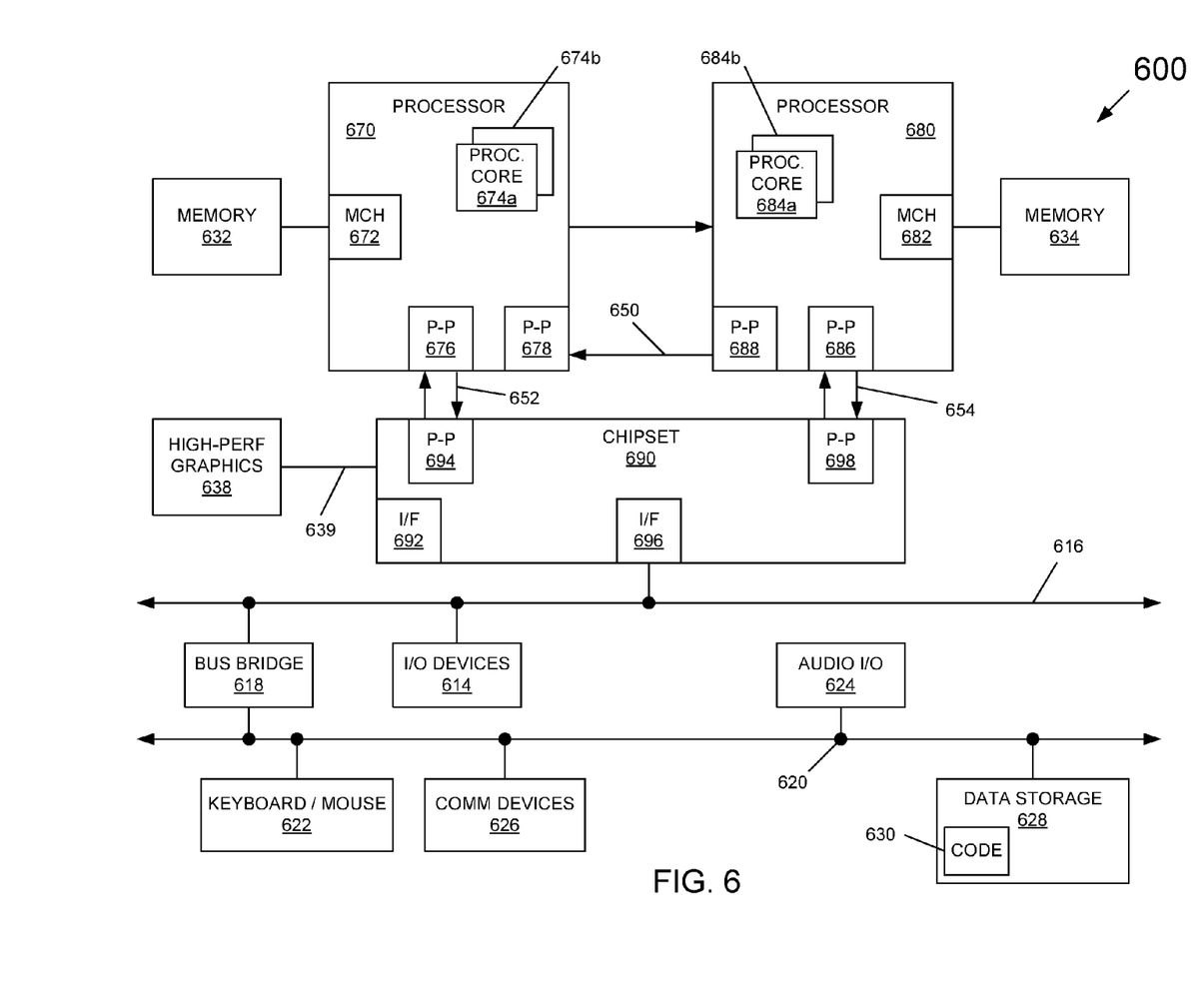
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., processor cores 674a and 674b and processor cores 684a and 684b), although potentially many more cores may be present in the processors. Each of the processors can include a PCU or other logic to perform dynamic power sharing between domains of the processor, as described herein.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 6, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 6, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 7:
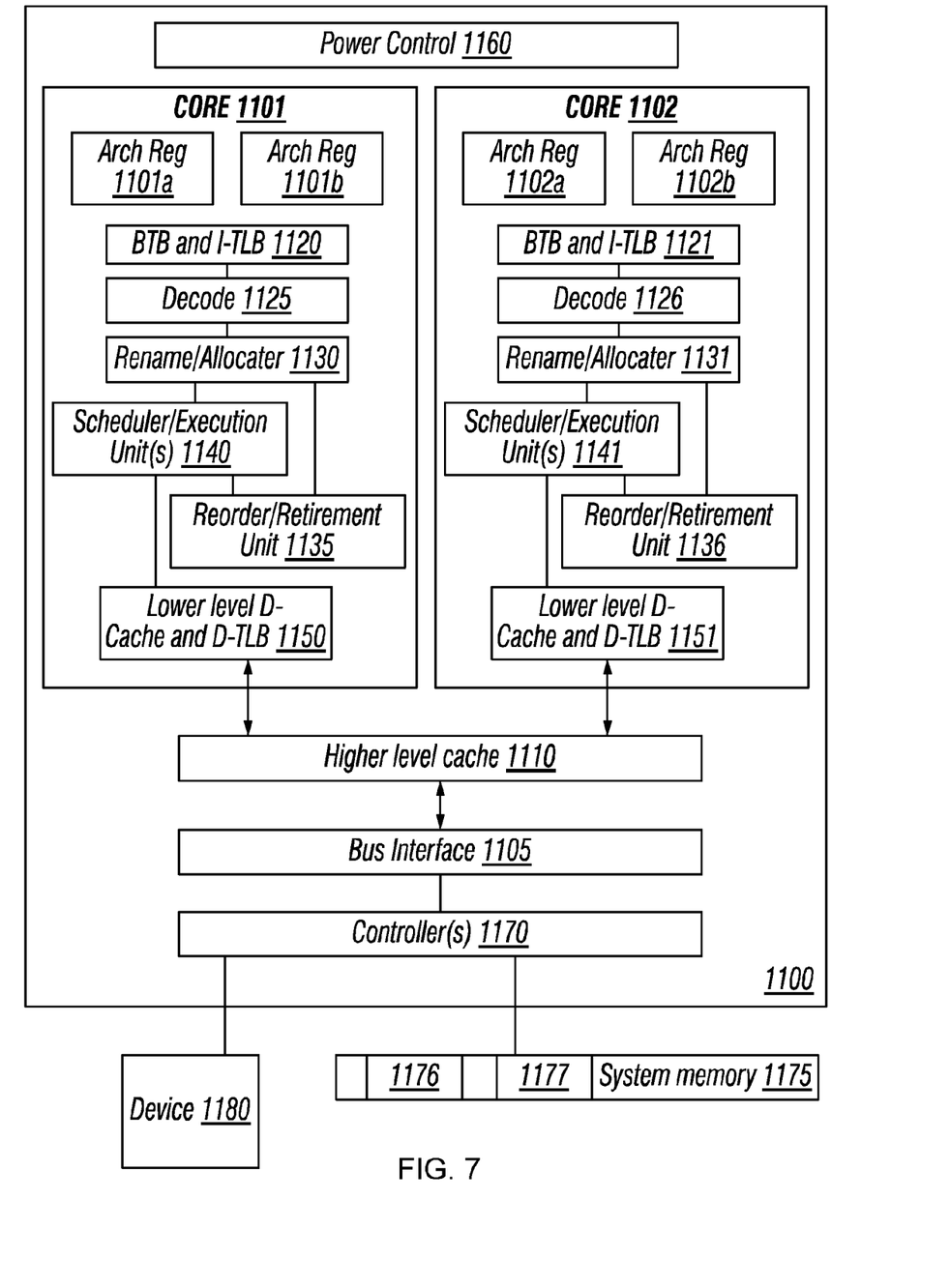
FIG. 7 is a block diagram of an embodiment of a processor including multiple cores is illustrated.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above. As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a first domain including at least one core to execute instructions;
   a second domain coupled to the first domain and including at least one non-core circuit, wherein the first and second domains are adapted to operate at independent frequencies; and
   a power control unit (PCU) coupled to the first and second domains, the PCU including a power sharing logic to receive encoded power consumption information comprising an index value provided from the second domain and to calculate an available power budget for the first domain based at least in part on the encoded power consumption information, the PCU to use the encoded power consumption information to select a power consumption value of the second domain from a plurality of power consumption values stored in a non-volatile storage accessible to the PCU, the encoded power consumption information not an encoding of the power consumption value.

2. The processor of claim 1, wherein the PCU further comprises a power calculation logic to calculate a package power consumption value based on the encoded power consumption information and a first domain power consumption value, and to communicate the package power consumption value to at least one agent external to the processor.

3. The processor of claim 2, wherein the at least one agent comprises an embedded controller, the embedded controller to adjust a speed of a fan responsive to the communication of the package power consumption value.

4. The processor of claim 1, wherein the first domain further comprises the non-volatile storage to store the plurality of power consumption values for a peripheral controller of the second domain, each of the power consumption values corresponding to a consumption level for a test scenario executed on the peripheral controller during high volume manufacturing testing.

5. The processor of claim 4, wherein the second domain further comprises a plurality of threshold registers each to store one of the plurality of power consumption values, wherein the plurality of power consumption values are to be communicated to the plurality of threshold registers from the non-volatile storage of the first domain via a basic input/output system (BIOS) during initialization of the processor.

6. The processor of claim 5, wherein the second domain further comprises a power meter, the power meter to estimate a power consumption value of the peripheral controller during normal operation.

7. The processor of claim 6, further comprising a detection logic to determine which of the plurality of threshold registers has a power consumption value correlating to the power consumption value estimate, and to communicate the encoded power consumption information corresponding to the correlating power consumption value.

8. The processor of claim 7, wherein the PCU comprises a monitor logic to receive the encoded power control information and to access a lookup table to determine the correlating power consumption value.

9. The processor of claim 8, wherein the PCU comprises a power budget update logic to calculate the available power budget for the first domain based on a total power budget for the processor and the correlating power consumption value.

10. A processor comprising:

at least one core to execute instructions and corresponding to a first domain;

a peripheral controller coupled to the at least one core and corresponding to a second domain, the peripheral controller to interface the at least one core to at least one peripheral device, the peripheral controller including a power meter to estimate a power consumption level of the peripheral controller and a detector to communicate an index value of a threshold register of the peripheral controller having a power consumption value correlating to the power consumption level estimate, the first and second domains to share a common power budget; and a power controller coupled to the at least one core and the peripheral controller, wherein the power controller includes a power budget update logic to determine an updated power budget for the first domain based on a total power budget for the processor and the correlating power consumption value responsive to receipt of the index value from the peripheral controller, the power controller further comprising a monitor logic to receive the index value from the peripheral controller and to access a lookup table with the index value to determine the correlating power consumption value, and wherein the power controller is to cause a frequency of the at least one core to be updated based at least in part on the updated power budget, wherein the index value is not an encoding of the power consumption value.

11. The processor of claim 10, wherein the at least one core and the peripheral controller are adapted within a processor package.

12. The processor of claim 10, further comprising an interface coupled between the first domain and the second domain to communicate the index value, the interface comprising a serial interface coupled between a first die including the first domain and a second die including the second domain.

* * * * *